United States Patent
Kubota et al.

(10) Patent No.: US 12,157,616 B2
(45) Date of Patent: Dec. 3, 2024

(54) BLISTER PACKAGE, METHOD FOR MANUFACTURING BLISTER PACKAGE, AND RF DEVICE USING BLISTER PACKAGE

(71) Applicants: Fujimori Kogyo Co., Ltd., Tokyo (JP); Sato Holdings Kabushiki Kaisha, Tokyo (JP)

(72) Inventors: You Kubota, Tokyo (JP); Rena Miyazaki, Tokyo (JP); Shinya Nitta, Tokyo (JP)

(73) Assignees: Fujimori Kogyo Co., Ltd., Tokyo (JP); Sato Holdings Kabushiki Kaisha, Tokyo (JP)

( * ) Notice: Subject to any disclaimer, the term of this patent is extended or adjusted under 35 U.S.C. 154(b) by 135 days.

(21) Appl. No.: 17/797,312

(22) PCT Filed: Jan. 18, 2021

(86) PCT No.: PCT/JP2021/001459
§ 371 (c)(1),
(2) Date: Aug. 3, 2022

(87) PCT Pub. No.: WO2021/157329
PCT Pub. Date: Aug. 12, 2021

(65) Prior Publication Data
US 2023/0059291 A1    Feb. 23, 2023

(30) Foreign Application Priority Data
Feb. 6, 2020   (JP) .................................. 2020-018855

(51) Int. Cl.
*B65D 75/36*   (2006.01)
*A61J 1/03*   (2023.01)
(Continued)

(52) U.S. Cl.
CPC ............ *B65D 75/367* (2013.01); *A61J 1/035* (2013.01); *B65B 11/52* (2013.01); *B65D 75/54* (2013.01); *G06K 19/07758* (2013.01)

(58) Field of Classification Search
CPC .................. B65D 75/367; B65D 75/54; G06K 19/07758; B65B 11/52; A61J 1/035
(Continued)

(56) References Cited

U.S. PATENT DOCUMENTS 6,375,956 B1 *   4/2002   Hermelin ............. B65D 75/327
424/464
2006/0065670 A1   3/2006   Doublet et al.
(Continued)

FOREIGN PATENT DOCUMENTS

JP   2003233673 A      8/2003
JP   2005112378 A  *   4/2005
(Continued)

OTHER PUBLICATIONS

Office Action issued by Japanese Patent Office for Application No. 2020-018855 dated Jul. 11, 2023.
(Continued)

*Primary Examiner* — Chun Hoi Cheung
(74) *Attorney, Agent, or Firm* — Murtha Cullina LLP

(57) ABSTRACT

The present invention provides a blister package including a sheet in which pockets are formed, and a lid material sealing the sheet, wherein the sheet has a first pocket accommodating an RF tag and a second pocket accommodating an article at a position separated from the first pocket.

12 Claims, 2 Drawing Sheets

(51) Int. Cl.
*B65B 11/52* (2006.01)
*B65D 75/54* (2006.01)
*G06K 19/077* (2006.01)

(58) Field of Classification Search
USPC .................................................. 206/528–540
See application file for complete search history.

(56) References Cited

U.S. PATENT DOCUMENTS

| | | | | |
|---|---|---|---|---|
| 2015/0096920 | A1* | 4/2015 | Trombley | B65D 75/36 |
| | | | | 206/531 |
| 2015/0347712 | A1* | 12/2015 | Flori | G16H 20/10 |
| | | | | 705/28 |
| 2016/0148084 | A1* | 5/2016 | Okamoto | G06K 19/07786 |
| | | | | 53/410 |
| 2020/0293849 | A1* | 9/2020 | Wakita | G06K 19/07 |
| 2021/0272058 | A1* | 9/2021 | Kourtis | G16H 20/13 |
| 2021/0275396 | A1* | 9/2021 | Bouthiette | H01R 12/721 |

FOREIGN PATENT DOCUMENTS

| | | |
|---|---|---|
| JP | 2005211601 A | 8/2005 |
| JP | 2008247418 A | 10/2008 |
| JP | 2010035789 | 2/2010 |
| JP | 2013049454 A | 3/2013 |
| WO | 2017057458 A1 | 9/2018 |
| WO | 2019069772 A1 | 4/2019 |

OTHER PUBLICATIONS

International Search Report For Corresponding International Application No. PCT/JP2021/001459 dated Mar. 30, 2021.
European Search Report for Application No. 21750871.2 dated Feb. 7, 2024.

* cited by examiner

BLISTER PACKAGE, METHOD FOR MANUFACTURING BLISTER PACKAGE, AND RF DEVICE USING BLISTER PACKAGE

FIELD OF THE INVENTION

The present invention relates to a blister package, a method for manufacturing the blister package, and an RF device using the blister package.

This application claims priority based on Japanese Patent Application No. 2020-018855 filed in Japan on Feb. 6, 2020, the contents of which are incorporated herein by reference.

BACKGROUND OF THE INVENTION

An RF tag using a radio wave of radio frequency (RF) has been used to manage inventory, distribution or the like of articles such as merchandise, products, components, and pharmaceuticals or the like. For example, Patent Document 1 (Japanese Unexamined Patent Application, First Publication No. 2003-233673) discloses a drug sales system using a wireless tag attached to an appropriate position on the outer surface of a drug package. Further, Patent Document 2 (Japanese Unexamined Patent Application, First Publication No. 2005-211601) discloses a drug container having an IC tag assigned to each drug.

SUMMARY OF THE INVENTION

Technical Problem

When an RF tag is attached to a package when packaging a drug, the RF tag may be damaged, deteriorated or fall off due to heat, pressure or the like during the processing or sealing of the package. Further, if the RF tag is attached to the package after the drug is packaged, the RF tag may be damaged, deteriorated or fall off due to external force during boxing, transportation, display or the like.

The present invention has been made in view of the above circumstances, and an objective of the present invention is to provide a blister package capable of suppressing damage, deterioration, falling-off, etc. of an RF tag, a method for manufacturing the blister package, and an RF device using the blister package.

Solution to Problem

The present invention provides a blister package including a sheet in which pockets are formed, and a lid material sealing the sheet, wherein the sheet includes a first pocket accommodating an RF tag and a second pocket accommodating an article at a position separated from the first pocket.

It is also possible to adopt a configuration in which the RF tag is fixed to the sheet side in the first pocket.

It is also possible to adopt a configuration in which the first pocket is opaque.

It is also possible to adopt a configuration in which the first pocket is larger than the RF tag.

It is also possible to adopt a configuration in which the RF tag is capable of detecting damage to the lid material.

It is also possible to adopt a configuration in which the lid material has a reinforcing member in a part sealing the first pocket, the reinforcing member being more reinforced than a part sealing the second pocket.

Further the present invention provides a method for manufacturing the blister package, comprising a step of accommodating the RF tag in the first pocket of the sheet in which the pockets are formed, a step of accommodating an article in the second pocket of the sheet, which is located at a position separated from the first pocket, and a step of sealing the sheet with the lid material.

Further, the present invention provides an RF device having a wireless reception function that receives signals from the outside and a wireless transmission function that transmits signals to the outside, comprising an RF tag having a wireless reception function and a wireless transmission function, a sheet for a blister package in which pockets are formed, and a lid material that seals the sheet, wherein the RF tag is accommodated in the pocket, and the sheet is sealed with the lid material.

It is also possible that the RF tag not be in contact with the lid material, and the distance between the RF tag and the lid material be kept constant.

It is also possible to adopt a configuration in which the RF tag is in contact with the lid material.

It is also possible to adopt a configuration in which the lid material is made of a metal foil or contains a metal foil.

It is also possible to adopt a configuration in which the lid material does not contain a metal foil and is made of an electrically insulating base material, and includes a circuit made of a printed conductive material on the base material.

It is also possible to adopt a configuration in which the lid material does not contain a metal foil and is made of an electrically insulating base material, and includes a circuit made of a metal wire on the base material.

Advantageous Effects of Invention

According to the present invention, since the RF tag is accommodated in the pocket of the blister package, it is possible to prevent the RF tag from being damaged, deteriorated, or fall off.

DETAILED DESCRIPTION OF THE INVENTION

Hereinafter, the present invention will be described with reference to the drawings based on the preferred embodiments.

Figure 1:
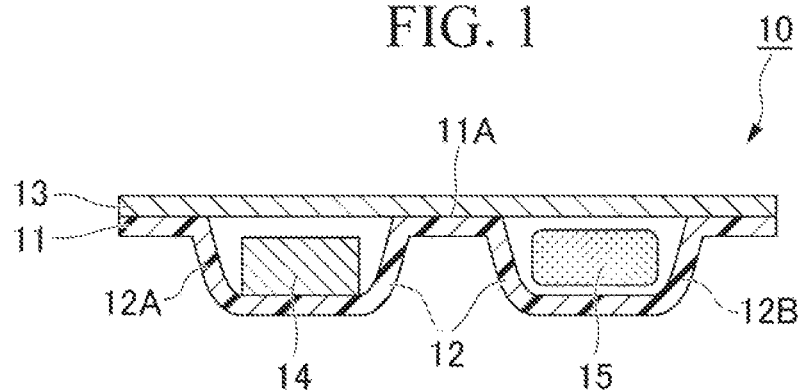
FIG. 1 is a cross-sectional view showing a blister package according to the first embodiment of the present invention.
Figure 2:
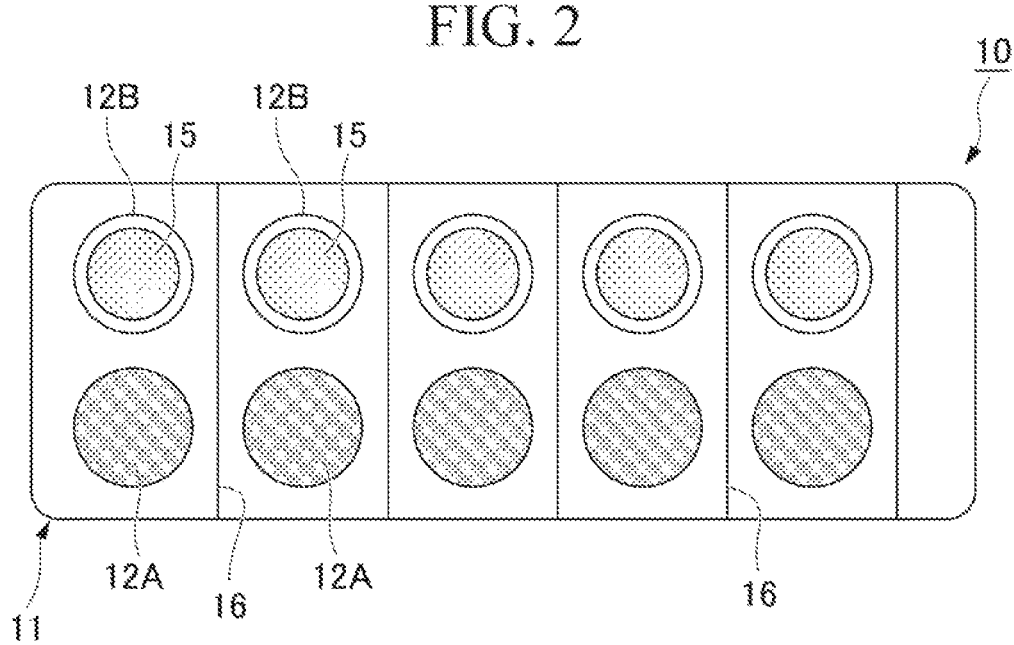
FIG. 2 is a bottom view showing a blister package according to the first embodiment of the present invention.

FIG. 1 shows a cross-sectional view of a blister package according to the first embodiment, and FIG. 2 shows a bottom view thereof. The blister package 10 includes a sheet 11 in which pockets 12 are formed, and a lid material 13 sealing the sheet 11. The sheet 11 has a plurality of pockets 12. Of the plurality of pockets 12, a first pocket 12A accommodates the RF tag 14. Further, an article 15 is accommodated in a second pocket 12B, which is located at a position separated from the first pocket 12A. In the following description, when it is not necessary to distinguish between the first pocket 12A and the second pocket 12B, these may be simply referred to as the pocket 12.

The pocket 12 formed on the sheet 11 is formed such that the pocket 12 is recessed from a joint surface 11A between the sheet 11 and the lid material 13, when forming the sheet 11 from various forming materials such as resin (plastic), paper (pulp), and metal. The shape, dimensions, and the like of the pocket 12 can be appropriately designed according to the shape, dimensions, quantity, and the like of the RF tag 14 or the article 15 accommodated in the pocket 12.

When the sheet 11 is formed from the resin, it is preferable to use a thermoplastic resin that can be easily formed. The sheet 11 having the pocket 12 may be formed from the flat sheet 11 by press molding or the like using a mold to form the pocket 12, or may be formed into the shape of the sheet 11 having the pocket 12 directly from the resin having fluidity by injection molding or the like.

Examples of the lid material 13 include metal foil, resin film, paper, laminated sheet and the like. When a PTP (Press-Through Package) is adopted as the blister package 10, it is preferable that the lid material 13 be made of a metal foil or contain a metal foil because it is excellent in barrier property, peelability and the like. When the lid material 13 made of a metal foil is joined to the resin sheet 11, a sealing material such as resin may be laminated on the surface of the metal leaf on the sheet 11 side. When the article 15 is taken out by peeling off the lid material 13 adhered to the joint surface 11A of the sheet 11, or by making a hole along the perforation or the like formed in the lid material 13, or by sliding the lid material 13 along the groove in which the peripheral edge of the sheet 11 is bent instead of adopting a PTP as the blister package, the lid material 13 may be made of a thick paper or the like.

The RF tag 14 has a wireless reception function for receiving a signal from the outside and a wireless transmission function for transmitting a signal to the outside. Therefore, the RF tag 14 may include, for example, an antenna, an IC chip, or the like. For example, when a radio wave is emitted from an external reader or the like and reaches the vicinity of the RF tag 14, the radio wave is received by the antenna of the RF tag 14. The operation of the RF tag 14 is started by using an external radio wave as a trigger. Information obtained from the IC chip is transmitted by modulating the radio wave reflected from the antenna.

When the RF tag 14 is a passive tag, it can be operated using an external radio wave as an energy source even if an internal power source such as a battery is not built therein. Further, when the RF tag 14 is an active tag or a semi-active tag, since it has a built-in power supply, it is possible to perform long-distance communication using the power of the internal power supply. The type of carrier wave used by the RF tag 14 for transmitting energy or a signal is not limited to radio waves, and various electromagnetic waves and the like can be used. For example, when the RF tag 14 uses the electromagnetic induction method, a magnetic flux can be used instead of the radio wave.

The blister package 10 can have one or more first pockets 12A for accommodating the RF tag 14. The first pocket 12A is preferably larger than the RF tag 14. When the RF tag 14 is accommodated in the first pocket 12A, if a gap is formed between the RF tag 14 and the inner surface of the first pocket 12A, the RF tag 14 can be easily accommodated. The width of the gap between the RF tag 14 and the first pocket 12A is not particularly limited, but may be, for example, about 1 to 20% with respect to the external dimensions of the RF tag 14. In the first pocket 12A, the RF tag 14 may be accommodated such that it is fixed to the sheet 11 side or the lid material 13 side, or is not fixed between the sheet 11 and the lid material 13.

Then fixing the RF tag 14 to the sheet 11, an adhesive agent may be provided between the RF tag 14 and the sheet 11 to bond them, or a fitting concave member for fitting the RF tag 14 may be provided in the sheet 11 in the first pocket 12A so that the RF tag 14 is fitted into the fitting concave member. The fitting concave member is a concave member smaller than the first pocket 12A. A convex member that fits with the fitting concave member may be formed in a part of the RF tag 14.

When the RF tag 14 is a metal-compatible tag, the RF tag 14 can be fixed to the lid material 13 even if the lid material 13 is made of metal. When the RF tag 14 is not a metal-compatible tag, a spacer may be arranged between the lid material 13 and the RF tag 14 so as to secure a distance such that the RF tag 14 is not affected by the metal of the lid material 13. Thereby, the RF tag 14 can be fixed to the metal lid material 13 via the spacer.

As shown in FIG. 2, when the first pocket 12A is opaque, it is possible to prevent the RF tag 14 from being visually recognized from the outside. For example, after forming the first pocket 12A on the transparent sheet 11, a light-shielding layer may be laminated on the inner surface or the outer surface of the first pocket 12A. Alternatively, a light-shielding layer may be laminated on the inner surface, the outer surface, or the inside in the thickness direction of the sheet 11 in the region of the first pocket 12A before forming the first pocket 12A on the sheet 11. The light-shielding layer may be a colored layer that absorbs light using a dye, a pigment, or the like, or a reflective layer that reflects light using a metal or the like.

The RF tag 14 preferably has a function of detecting damage to the lid material 13. The RF tag 14 may have, for example, a sensor that electromagnetically or optically detects the distance from the lid material 13. When the blister package 10 is a PTP, damage to the lid material 13 due to the removal of the article 15 may be detected. When the lid material 13 is provided with a detection line such as an antenna so as to connect the first pocket 12A and the second pocket 12B, the breakage of the lid material 13 in the second pocket 12B can be easily detected from the RF tag 14 in the first pocket 12A.

In addition to the RF tag 14, the blister package 10 can package various articles 15 such as pharmaceuticals, foods, cosmetics, drugs, medical devices, industrial components, various products, and various merchandise. As the article 15, various forms such as a solid, a liquid, a powder, granules, a fluid, and a viscous body can be adopted. For example, when a granular article 15 such as a tablet or a capsule is accommodated in the blister package 10 of PTP, the article 15 can be taken out of the blister package 10 by pressing the article 15 to break through the lid material 13 through the second pocket 12B. When the second pocket 12B is transparent, the article 15 can be visually confirmed from the outside.

The blister package 10 may have one or more second pockets 12B for accommodating the article 15. When the article 15 is a solid having a fixed shape, the second pocket 12B is preferably larger than the article 15. When the article 15 is accommodated in the second pocket 12B, if a gap is formed between the article 15 and the inner surface of the second pocket 12B, the article 15 can be easily stored. The width of the gap between the article 15 and the second pocket 12B is not particularly limited, but may be, for example, about 1 to 20% with respect to the external dimensions of the article 15. The first pocket 12A and the second pocket 12B may be substantially the same size or different sizes from each other.

When the number of RF tags 14 accommodated in the blister package 10 is the same as the number of articles 15, the RF tags 14 and the articles 15 may have a one-to-one correspondence as shown in FIG. 2. In this case, the RF tags 14 and articles 15 corresponding to each other may be arranged in the adjacent pockets 12. For example, when the pockets 12 are arranged in a plurality of rows and columns, the row in which only the first pockets 12A are arranged and the row in which only the second pockets 12B are arranged may be arranged next to each other. The sheet 11 may have a cut line 16 so that the first pocket 12A and the second pocket 12B are paired with each other. Further, in the same row, the first pocket 12A and the second pocket 12B may be arranged alternately.

A different identification code may be recorded for each RF tag 14 on the RF tag 14 accommodated in each blister package 10. Further, when a plurality of RF tags 14 are accommodated in the blister package 10 and each RF tag 14 corresponds to a different article 15, a different identification code may be recorded for each RF tag 14. In this case, it is easy to manage each article 15. One RF tag 14 may be associated with a plurality of articles 15.

The blister package 10 can be manufactured in the same manner as the conventional blister package 10 except that the RF tag 14 is packaged together with the article 15. The method for manufacturing the blister package 10 of the present embodiment includes a first accommodation step of accommodating the RF tag 14 in the first pocket 12A, a second accommodation step of accommodating the article 15 in the second pocket 12B, and a sealing step of sealing the sheet 11 with the lid material 13.

The first accommodation step may be carried out before the second accommodation step, or after the second accommodation step, or the first accommodation step and the second accommodation step may be carried out at the same time. The sealing step is preferably carried out after the completion of the first accommodation step and the second accommodation step. If the sheet 11 has a large number of pockets 12, while the first accommodation step and the second accommodation step are completed and the sealing step is being carried out in an area of the sheet 11, in another area of the sheet 11, the first accommodation step or the second accommodation step may be carried out.

Figure 3:
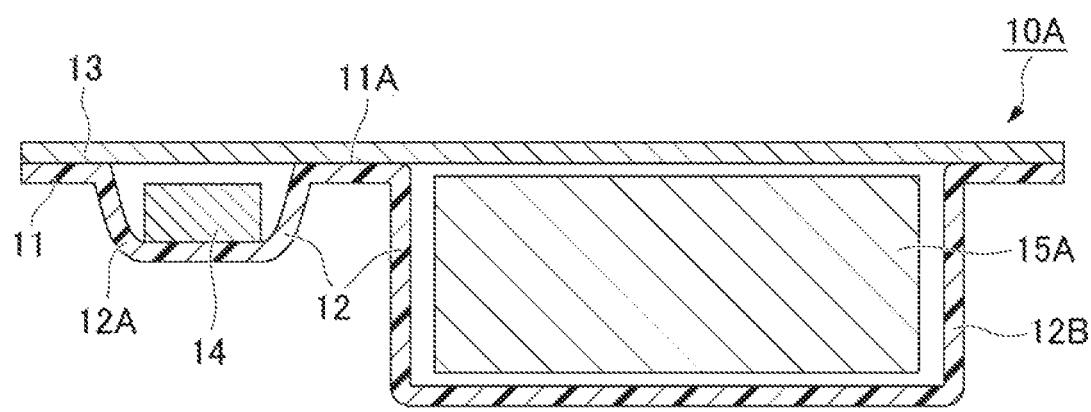
FIG. 3 is a cross-sectional view showing a blister package according to the second embodiment of the present invention.

FIG. 3 shows a blister package 10A according to the second embodiment. The sheet 11 of the blister package 10A has the second pocket 12B that is larger than the first pocket 12A because it accommodates the article 15A that is larger than the RF tag 14. When the lid material 13 is made of a resin sheet, thick paper or the like, which is preferable, the lid material 13 is less likely to be torn even if a large article 15A comes into contact with the lid material 13. In this case, in order to take out the article 15A from the blister package 10A, the lid material 13 may be peeled off from the sheet 11, or an opening line such as a perforation may be provided in the lid material 13 so that an opening along the opening line can be formed.

Figure 4:
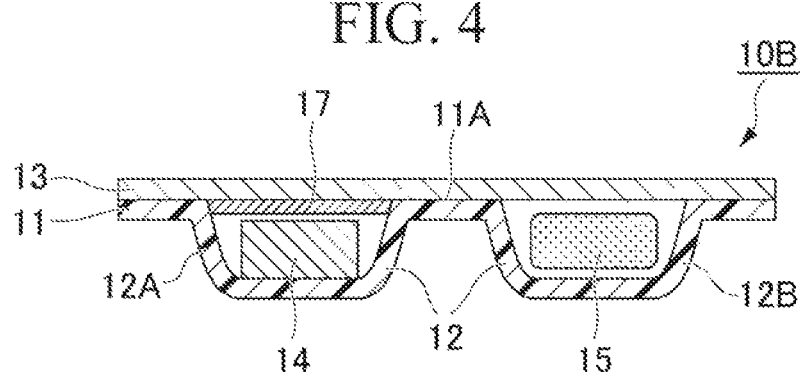
FIG. 4 is a cross-sectional view showing a blister package according to the third embodiment of the present invention.

FIG. 4 shows a blister package according to the third embodiment. The lid material 13 of a blister package 10B has a reinforcing member 17 that is more reinforced in a part that seals the first pocket 12A than a part that seals the second pocket 12B. Examples of the reinforcing member 17 include laminating a laminated material having a strength higher than that of the lid material 13 on the inner surface, the outer surface, the inside in the thickness direction, and the like of the lid material 13. For example, when the blister package 10B is a PTP, a resin film, paper or the like may be laminated on a part of the lid material 13 as the reinforcing member 17. The reinforcing member 17 can be formed in a part or all of the first pocket 12A. Further, a part of the reinforcing member 17 may overlap on the joint surface 11A of the sheet 11.

According to the blister packages 10, 10A and 10B, since the RF tag 14 is accommodated in the first pocket 12A of the formed sheet 11, the affecting factors from the outside of the blister package 10 such as external force, moisture and the like are less likely to affect the RF tag 14. This makes it possible to prevent the RF tag 14 from being damaged, deteriorating, falling off or the like.

The blister packages 10, 10A, and 10B can be used as an RF device by imparting the RF tag 14 with a wireless reception function for receiving a signal from the outside and a wireless transmission function for transmitting a signal to the outside. Furthermore, it is also possible to configure an RF device by accommodating only the RF tag 14 in the blister package without accommodating the article 15.

The RF tag 14 can be used for management of the article 15 by the manufacturer, management of transportation from the manufacturer to an intermediate business such as a wholesaler, a retailer, etc., management by the intermediate business, and the like. When a plurality of articles 15 are accommodated in the blister packages 10, 10A, 10B and these articles 15 are to be used continuously in a predetermined order, number, etc., it can also be used for management when the articles are provided to consumers by an intermediate business operator or when the articles are used by consumers. When the article 15 is a drug such as a tablet, it can also be used in a hospital, a pharmacy or the like to manage the administration status of a patient.

Figure 5:
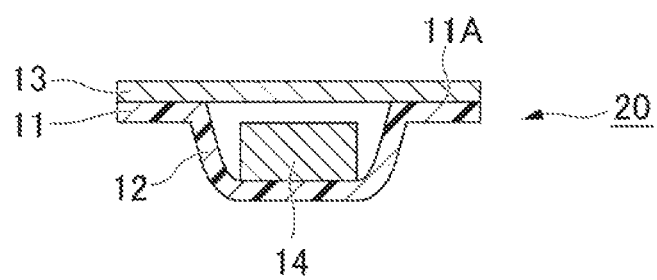
FIG. 5 is a cross-sectional view showing an RF device according to the fourth embodiment of the present invention.
Figure 6:
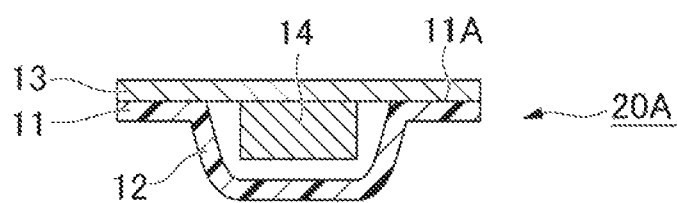
FIG. 6 is a cross-sectional view showing an RF device according to the fifth embodiment of the present invention.

FIG. 5 shows an RF device according to the fourth embodiment. Further, FIG. 6 shows an RF device according to the fifth embodiment. RF devices 20 and 20A include an RF tag 14, a sheet 11 for a blister package in which pockets 12 are formed, and a lid material 13 sealing the sheet 11. The RF tag 14 is accommodated in the pocket 12. Further, the sheet 11 is sealed by the lid material 13, and the pocket 12 is closed.

In the RF device 20 according to the fourth embodiment, the RF tag 14 does not come into contact with the lid material 13, and the distance between the RF tag 14 and the lid material 13 is kept constant. For example, when the lid material 13 is torn, the distance from the lid material 13 changes. When the lid material 13 contains metal, the communication performance and communication state of the RF tag 14 change due to the deformation of the lid material 13. For example, by detecting a change in the response radio wave intensity of the RF tag 14 obtained by the distance between the RF tag 14 and the lid material 13, it is possible to detect whether or not the lid material 13 is torn. The RF tag 14 may be fixed to the sheet 11 side in the pocket 12.

In the RF device 20A according to the fifth embodiment, the RF tag 14 is in contact with the lid material 13. In this case, the RF tag 14 may be fixed to the lid material 13.

The lid material 13 may be made of an electrically insulating base material without containing a metal foil. A wiring layer made of a printed conductive material may be provided on the electrically insulating base material of the lid material 13. Examples of the conductive material used for printing include a conductive ink containing conductive particles such as metal particles, carbon particles or the like, conductive pastes, and the like. Examples of the base material include a resin, paper, non-woven fabric and the like. Further, a wiring layer made of a metal wire may be provided on the base material. The metal wire may form a metal wire pattern by etching a metal layer, a metal foil or the like, that is formed by plating or the like. The wiring layer of the lid material 13 may constitute a circuit, an antenna or the like. By providing the wiring layer and the circuit on the lid material 13, the RF tag 14 and the circuit of the lid material 13 can be electrically connected.

According to the RF devices 20 and 20A, since the RF devices 20 and 20A constitute a blister package and the RF tag 14 is accommodated in the first pocket 12A of the formed sheet 11, the affecting factors from the outside of the blister package 10 such as external force, moisture or the like are less likely to affect the RF tag 14. This makes it possible to prevent the RF tag 14 from being damaged, deteriorating, falling off or the like.

The RF devices 20 and 20A can be used in the same manner as the blister packages 10, 10A and 10B except that the article 15 is not accommodated. For example, the RF devices 20 and 20A may be packaged so as to be packaged with a package such as a blister package accommodating the article 15. Since the RF devices 20 and 20A do not accommodate the article 15, they can be easily reused if they are collected by a business operator, a hospital, a pharmacy or the like. The RF devices 20 and 20A may be provided with two or more pockets 12, or may accommodate two or more RF tags 14 having different uses.

Although the present invention has been described above based on a preferred embodiment, the present invention is not limited to the above-described embodiments, and various modifications can be made without departing from the scope of the present invention. Modifications include addition, replacement, omission, and other changes of components in each embodiment. It is also possible to appropriately combine the components used in the two or more embodiments.

For example, the configurations of the sheet 11, the lid material 13, the RF tag 14 and the like common to the blister packages 10, 10A and 10B and the RF devices 20, 20A can be modified in the same manner. Further, in the RF devices 20 and 20A, the pocket 12 accommodating the RF tag 14 can be modified in the same manner as the configuration of the first pocket 12A accommodating the RF tag 14 in the blister packages 10, 10A and 10B.

REFERENCE SIGNS LIST 10, 10A, 10B: Blister package
11: Sheet;
11A: Joint surface
12: Pocket
12A: First pocket
12B: Second pocket
13: Lid material
14: RF tag
15, 15A: Article
16: Cutting line
17: Reinforced part
20, 20A: RF device.

The invention claimed is:

1. A blister package comprising:
a sheet in which pockets are formed, and
a lid material sealing the sheet,
wherein the sheet comprises a first pocket accommodating an RF tag and a second pocket accommodating an article at a position separated from the first pocket,
the first pocket and the second pocket have the same size,
a light-shielding layer is laminated on an inner surface or an outer surface of the first pocket, or on an inner side in a thickness direction of the sheet in a region of the first pocket, so that the first pocket is opaque, and
the second pocket is transparent.

2. The blister package according to claim 1, wherein the RF tag is fixed to the sheet side in the first pocket.

3. The blister package according to claim 1, wherein the first pocket is larger than the RF tag.

4. The blister package according to claim 1, wherein the RF tag is capable of detecting damage to the lid material.

5. The blister package according to claim 1, wherein the lid material has a reinforcing member in a part sealing the first pocket, the reinforcing member being more reinforced than a part sealing the second pocket.

6. A method for manufacturing the blister package according to claim 1, comprising:
a step of accommodating the RF tag in the first pocket of the sheet in which the pockets are formed,
a step of accommodating the article in the second pocket of the sheet, which is located at a position separated from the first pocket, and
a step of sealing the sheet with the lid material.

7. The blister package according to claim 1, wherein the RF tag has a wireless reception function for receiving a signal from the outside and a wireless transmission function for transmitting a signal to the outside.

8. The blister package according to claim 7, wherein the RF tag is not in contact with the lid material, and the distance between the RF tag and the lid material is kept constant.

9. The blister package according to claim 7, wherein the RF tag is in contact with the lid material.

10. The blister package according to claim 7, wherein the lid material is made of a metal foil or contains a metal foil.

11. The blister package according to according to claim 7, wherein
the lid material does not contain a metal foil,
the lid material is made of an electrically insulating base material, and
the lid material includes a circuit made of a printed conductive material on the base material.

12. The blister package according to claim 7, wherein
the lid material does not contain a metal foil,
the lid material is made of an electrically insulating base material, and
the lid material includes a circuit made of a metal wire on the base material.

* * * * *